United States Patent
Rubinchik

[11] Patent Number: 6,020,668
[45] Date of Patent: *Feb. 1, 2000

[54] END CASE MOUNTED BRUSH HOLDER ASSEMBLY

[75] Inventor: Ilya Rubinchik, London, Canada

[73] Assignee: Siemens Canada Ltd., Mississauga, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 09/007,545

[22] Filed: Jan. 15, 1998

[51] Int. Cl.[7] .............................. H02K 13/00; H02K 5/14; H02K 5/24

[52] U.S. Cl. ........................ 310/239; 310/91; 310/242; 310/245

[58] Field of Search .................... 310/67 R, 91, 310/233, 238, 239, 242, 245; 29/596, 598

[56] References Cited

U.S. PATENT DOCUMENTS

| | | |
|---|---|---|
| 1,521,605 | 1/1925 | Diehi . |
| 2,275,613 | 3/1942 | Cullin ..................................... 171/324 |
| 3,106,666 | 10/1963 | Merrriam, Jr. ......................... 310/239 |
| 3,212,041 | 10/1965 | Dixon ..................................... 336/149 |
| 3,219,860 | 11/1965 | Redick et al. ......................... 310/239 |
| 3,527,971 | 9/1970 | Means .................................... 310/239 |
| 3,586,892 | 6/1971 | Sato ........................................ 310/68 |
| 3,654,504 | 4/1972 | Susdorf et al. ......................... 310/239 |
| 3,745,393 | 7/1973 | Spors ..................................... 310/239 |
| 4,056,749 | 11/1977 | Carlson Jr. et al. .................... 310/239 |
| 4,112,321 | 9/1978 | Wan ....................................... 310/242 |
| 4,177,396 | 12/1979 | Wang ..................................... 310/68 |
| 4,292,560 | 9/1981 | Vorndran ................................ 310/242 |
| 4,293,789 | 10/1981 | King ....................................... 310/239 |
| 4,355,253 | 10/1982 | Vollbrecht ............................. 310/239 |
| 4,613,781 | 9/1986 | Sanders ................................. 310/239 |
| 4,621,991 | 11/1986 | Smith et al. .......................... 417/423 |
| 4,638,203 | 1/1987 | Maki et al. ............................ 310/239 |
| 4,673,836 | 6/1987 | Alkyama et al. ..................... 310/239 |
| 4,728,835 | 3/1988 | Baines .................................... 310/71 |
| 4,746,829 | 5/1988 | Strobl ..................................... 310/239 |
| 4,800,313 | 1/1989 | Warner et al. ........................ 310/242 |
| 4,801,833 | 1/1989 | Dye ....................................... 310/239 |
| 4,990,811 | 2/1991 | Nakata et al. ........................ 310/239 |
| 5,006,747 | 4/1991 | Stewart, Sr. .......................... 310/239 |
| 5,159,222 | 10/1992 | Southall ................................ 310/239 |
| 5,414,317 | 5/1995 | Reid et al. ............................ 310/239 |
| 5,414,318 | 5/1995 | Shimizu et al. ...................... 310/239 |
| 5,444,320 | 8/1995 | Clarke et al. ......................... 310/239 |
| 5,661,357 | 8/1997 | Iijima ..................................... 310/239 |
| 5,696,418 | 12/1997 | Corbach et al. ...................... 310/239 |
| 5,744,889 | 4/1998 | Niimi ..................................... 310/239 |

*Primary Examiner*—Nestor Ramirez
*Assistant Examiner*—Tran N Nguyen

[57] ABSTRACT

A brush holder assembly for mounting on an electric machine casing. The brush holder assembly includes a brush, a brush guide that supports and guides the brush for travel, a spring for biasing the brush in a direction toward a commutator, and an electric insulator mounting for mounting the brush guide on a casing. The electric insulator mounting has electric insulator elements containing grooves engaging the side edges of the brush guide to support the brush guide and the brush in spaced relation to a casing when the brush holder assembly is mounted thereon. The brush guide has at least one wiring tab. Several forms for attaching the insulator elements to the casing are disclosed including threaded fasteners; integral grommet formations of the insulator elements; and the insulator elements being integral formations of the casing.

43 Claims, 6 Drawing Sheets

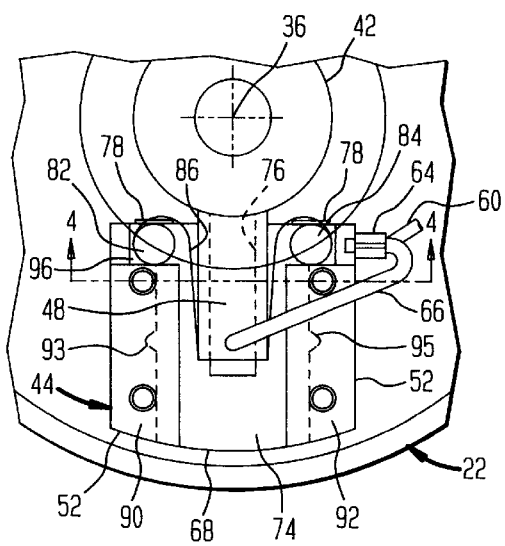
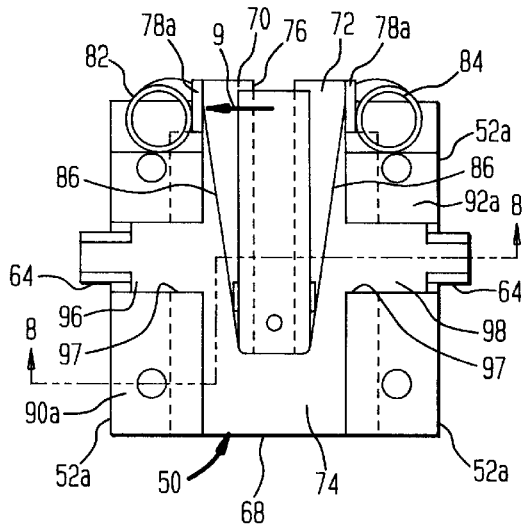
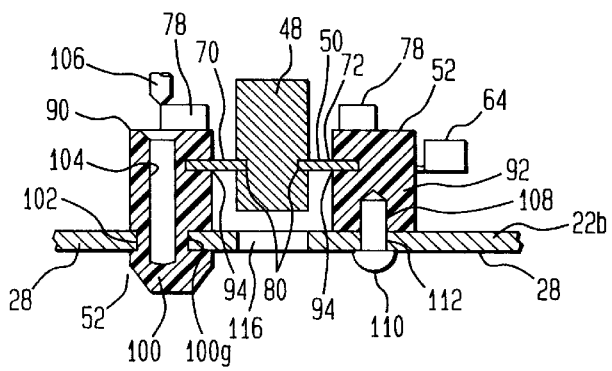
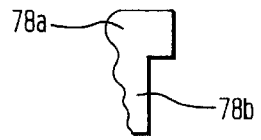
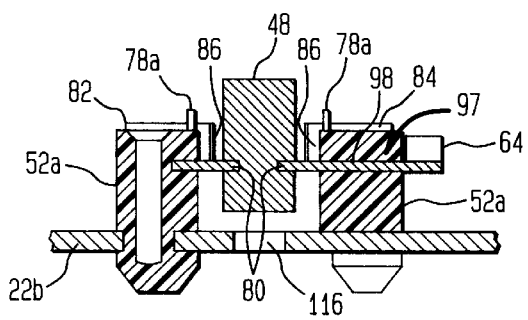

END CASE MOUNTED BRUSH HOLDER ASSEMBLY

FIELD OF THE INVENTION

This invention relates generally to rotating electric machines, such as direct current motors for example, and more particularly to the mounting of brush holder assemblies on such machines.

BACKGROUND OF THE INVENTION

A number of patents disclose various mountings for brushes on a transverse end wall of a motor casing. One known mounting is essentially a brush card which contains the brushes and is attached to a motor casing end wall. Another known mounting comprises a formed insulator member containing the brushes. Still another comprises the use of such an insulator member as a motor end casing wall.

SUMMARY OF THE INVENTION

The present invention relates to novel brush holder assembly mountings for mounting brushes on a transverse wall of a dynamoelectric machine. The examples that will be disclosed herein relate to the mounting of brush holder assemblies on end casings of D.C. motors.

One general aspect of the invention relates to an electric machine comprising a casing, an armature shaft assembly journaled for rotation on the casing about an axis of rotation and comprising an armature and a commutator disposed internally of the casing, the casing comprising a transverse wall that is disposed proximate the commutator, and at least one brush holder assembly disposed on the casing transverse wall, the brush holder assembly comprising a brush, a brush guide that supports and guides the brush for travel relative to the commutator in a direction that has a radial component relative to the axis of rotation, and an electric insulator mounting that mounts the brush guide on the transverse wall, the electric insulator mounting comprising at least one electric insulator element comprising a groove engaging the brush guide at a distance spaced from the transverse wall to support the brush guide and the brush in spaced relation to the transverse wall.

This one general aspect is more specifically characterized by the groove comprising opposite side portions that are spaced apart in a direction axially of the axis of rotation; by the groove being generally parallel to a radial to the axis of rotation; by opposite side portions of the groove being mutually parallel and spaced apart a substantially uniform distance along the length of the groove; by the brush guide comprising a part formed from metal of uniform thickness, the brush guide comprising a free edge portion having that uniform thickness, and the groove of the electric insulator element engaging the brush guide by fitting onto that free edge portion of the brush guide; by the electric insulator mounting comprising two such electric insulator elements which are spaced apart circumferentially of the axis of rotation and each of which comprises a respective groove engaging the brush guide at a distance spaced from the transverse wall to support the brush guide and the brush in spaced relation to the transverse wall; by the respective grooves of two electric insulator elements engaging respective edge portions of the brush guide at a distance spaced from the transverse wall to support the brush guide and the brush in spaced relation to the transverse wall; by the respective grooves being generally parallel to a radial to the axis of rotation; by the brush guide comprising a guide path for the brush disposed circumferentially between the two electric insulator elements; by the brush guide comprising marginal edge portions that define a slot providing the guide path for the brush, and the brush comprising grooves that fit onto these marginal edge portions; by the guide path for the brush being substantially radial to the axis of rotation; by a bias spring for biasing the brush into engagement with the commutator; by attachment means for attaching the at least one electric insulator element to the transverse wall; and by the transverse wall being disposed in an end casing part of the casing.

Another general aspect of the invention relates to an electric machine comprising a casing, an armature shaft assembly journaled for rotation on the casing about an axis of rotation and comprising an armature and a commutator disposed internally of the casing, the casing comprising a transverse wall that is disposed proximate the commutator, and at least one brush holder assembly disposed on the casing transverse wall, the brush holder assembly comprising a brush, a brush guide that supports and guides the brush for travel relative to the commutator in a direction that has a radial component relative to the axis of rotation, and an electric insulator mounting that mounts the brush guide on the transverse wall, the electric insulator mounting comprising plural, spaced apart, electric insulator elements each engaging a respective portion of the brush guide at a distance spaced from the transverse wall to support the brush guide and the brush in spaced relation to the transverse wall.

This other general aspect is more specifically characterized by two electric insulator elements comprising respective grooves that engage respective portions of the brush guide; by the respective grooves being generally parallel to a radial to the axis of rotation; by the brush guide comprising a part formed from metal of uniform thickness, the brush guide comprising free edge portions having that uniform thickness, and the grooves of the electric insulator elements engaging the brush guide by fitting onto those free edge portion of the brush guide; by the brush guide comprising a guide path for the brush disposed circumferentially between two electric insulator elements; by a bias spring for biasing the brush; by attachment means for attaching each electric insulator element to the transverse wall; and by the transverse wall being disposed in an end casing part of the casing.

A further general aspect of the invention relates to a brush holder assembly for mounting on an electric machine casing, the brush holder assembly comprising a brush, a brush guide that supports and guides the brush for travel, and an electric insulator mounting for mounting the brush guide on a casing, the electric insulator mounting comprising at least one electric insulator element comprising a groove engaging the brush guide to support the brush guide and the brush in spaced relation to a casing when the brush holder assembly is mounted thereon.

This further general aspect is more specifically characterized by the groove comprising spaced apart opposite side portions; by the opposite side portions of the groove being mutually parallel and spaced apart a substantially uniform distance along the length of the groove; by the brush guide comprising a part formed from metal of uniform thickness, the brush guide comprising a free edge portion having that uniform thickness, and the groove of the electric insulator element engaging the brush guide by fitting onto that free edge portion of the brush guide; by the electric insulator mounting comprising two such electric insulator elements which are spaced apart and each of which comprises a respective groove engaging the brush guide to support the brush guide and the brush in spaced relation to a casing when the brush holder assembly is mounted thereon; by the brush guide comprising a guide path for the brush disposed circumferentially between the two electric insulator elements; and by the brush guide comprising marginal edge portions that define a slot providing the guide path for the brush, and the brush comprising grooves that fit onto these marginal edge portions.

A still further general aspect of the invention relates to a brush holder assembly for mounting on an electric machine casing, the brush holder assembly comprising a brush, a brush guide that supports and guides the brush for travel, and plural electric insulator elements which are spaced apart and each of which engages the brush guide to support the brush guide and the brush in spaced relation to a casing when the brush holder assembly is mounted thereon.

This still further general aspect is more specifically characterized by the electric insulator mounting comprising two such electric insulator elements which are spaced apart and each of which comprises a respective groove engaging the brush guide to support the brush guide and the brush in spaced relation to a casing when the brush holder assembly is mounted thereon; by the brush guide comprising a guide path for the brush disposed circumferentially between the two electric insulator elements; by the brush guide comprising marginal edge portions that define a slot providing the guide path for the brush, and the brush comprising grooves that fit onto these marginal edge portions; and by attachment means for attaching the electric insulator elements to a casing, the attachment means including a hole in the insulator element, and a fastener that comprises a shank engaging the insulator element hole.

Yet another general aspect of the invention relates to an electric machine end casing assembly comprising an end casing, a brush holder assembly on the machine casing, the brush holder assembly comprising a brush, a brush guide that supports and guides the brush for travel, and an electric insulator mounting for mounting the brush guide on the casing, the electric insulator mounting comprising at least one electric insulator element comprising a groove engaging the brush guide to support the brush guide and the brush in spaced relation to the casing.

This yet another general aspect is more specifically characterized by various attachment means including means for attaching the at least one electric insulator element to the end casing wherein the attachment means comprising a threaded fastener; the attachment means comprises a grommet formation of the at least one insulator element engaging a hole in the end casing; and the attachment means comprising the at least one electric insulator element comprising an integral formation in at least a portion of the end casing.

The foregoing, and other features, along with various advantages and benefits of the invention, will be seen in the ensuing description and claims which are accompanied by drawings. The drawings, which are incorporated herein and constitute part of this specification, disclose a preferred embodiment of the invention according to the best mode contemplated at this time for carrying out the invention.

BRIEF DESCRIPTION OF THE DRAWINGS

FIG. 3 is an enlarged fragmentary view of a portion of FIG. 2 showing a brush holder assembly.

FIG. 4 is a cross section view taken generally along line 4—4 in FIG. 3, certain portions being broken away for illustrative clarity.

FIG. 7 is a view similar to FIG. 3 showing another embodiment of brush holder assembly by itself.

FIG. 8 is a cross section view taken along line 8—8 in FIG. 7.

FIG. 9 is a partial view in the direction of arrow 9 in FIG. 7 to show certain detail of a part of a brush holder.

DESCRIPTION OF THE PREFERRED EMBODIMENT

Figure 1:
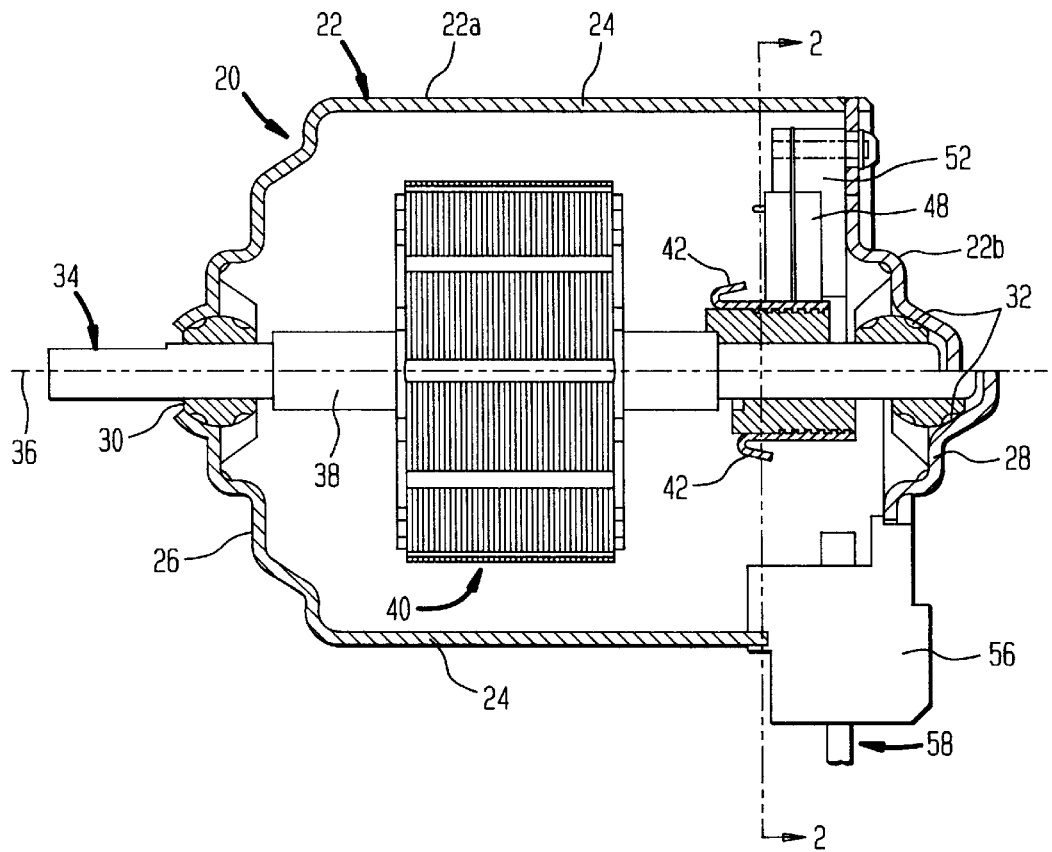
FIG. 1 is a longitudinal cross section view showing portions of a two-pole D.C. motor embodying brush holder assembly mountings in accordance with principles of the present invention.
Figure 2:
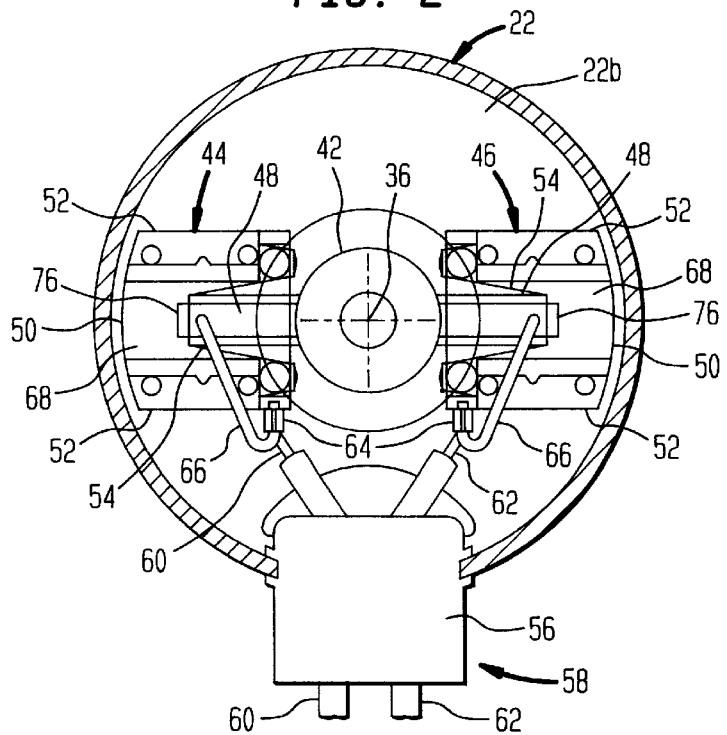
FIG. 2 is a transverse cross section view taken along line 2—2 in FIG. 1.

FIGS. 1 and 2 show portions of an electric D.C. motor 20 useful in understanding principles of the present invention. Motor 20 comprises a casing 22 having a main casing part 22a and an end closure part 22b. Main casing part 22a is, by way of example, a one-piece drawn steel shell that comprises a cylindrical axial wall 24 and a transverse end wall 26 at one axial end. End closure part 22b is, by example also, a formed steel part assembled to main part 22a in any suitable fashion to provide a transverse end wall 28 that is opposite end wall 26 and that closes the interior of casing 22. The two end walls 26, 28 contain respective bearings 30, 32 that are in mutual alignment to journal an armature shaft assembly 34 for rotation about an axis 36.

Armature shaft assembly 34 comprises a shaft 38 having one end journaled in bearing 32 and another end journaled in, but protruding externally from, bearing 30 so that the shaft can be coupled to a load that the motor is to operate. Internally of casing 22, shaft assembly 34 comprises an armature 40 and a commutator 42. Because details of armature 40 and commutator 42 do not bear directly on principles of the present invention, a detailed description of them is not presented in the interest of brevity. Suffice it to say that FIG. 1 shows armature core laminations disposed on shaft 38, and it is to be understood that windings (not shown) are disposed thereon and connected with respective segment bars of commutator 42. The stator structure is likewise not specifically shown in FIG. 1, but in the case of a permanent magnet D.C. motor, the stator would comprise one or more permanent magnets arranged for interaction with the armature windings. FIG. 1 shows the right-hand portion of the motor split along axis 36 solely for the purpose of illustrating how the axial length of a motor can be shortened as a result of the present invention. The top half represents the actual cross section of the motor which is uniform about the entire axis. The bottom half, including the portions of shaft assembly 34, commutator 42, bearing 32, end wall 28, and a wiring harness grommet 56 (to be described), represent a longer length of motor that is required when brush holders are mounted on a brush card assembly inside of the end wall, such a brush card assembly being eliminated by embodying the present invention in a motor.

Commutator 42 is disposed proximate end wall 28. Two brush holder assemblies 44, 46 are disposed on end wall 28 diametrically opposite each other about axis 36 internal of casing 22. Each brush holder assembly comprises a respective brush 48, guided by a respective brush guide 50 for motion radial to axis 36. Each guide 50 is supported by a respective mounting 52 which is in turn disposed on end wall 28. Respective springs 54 urge the respective brushes 48 radially inward so that the radially inner faces of the brushes are biased into contact with commutator 42.

Casing 22 comprises an opening that accepts a grommet 56 which is part of a wiring harness 58. Wiring harness 58 contains respective insulated wires 60, 62 that are gripped by grommet 56 as they pass from the interior to the exterior of casing 22. Internally of casing 22, the respective end of each wire 60, 62 is stripped of insulation. Each brush guide 50 contains a respective wiring tab 64. Each wiring tab 64 is crimped onto both the stripped end of the respective wire 60, 62 and also an end of a respective pig-tail 66 that extends from the respective brush 48. In this way each brush 48 is electrically in common with a respective one of the wires 60, 62 so as to enable voltage that is applied from an external source (not shown) across the respective wires to be impressed across the pair of brushes and thereby operate the motor. Although not specifically illustrated, the two wires may terminate externally in a connector plug for connecting the motor with an electric circuit for operating the motor.

Further detail of each brush holder assembly can be seen in FIGS. 3 and 4. Each brush guide 50 comprises a flat main body 68 that is disposed in a plane perpendicular to axis 36. As viewed axially of the motor, each main body 68 comprises respective parallel sidewalls 70, 72 and a respective radially outer end wall 74 extending between the corresponding sidewalls 70, 72. The confronting edges of sidewalls 70, 72 define a radial slot 76 that is open at the radially inner end but closed at the radially outer end by end wall 74. Sidewalls 70, 72 may also be provided with brush locking tabs (not specifically shown) proximate the radially outer end of slot 76.

The radially inner end of each brush guide 50 is formed with a pair of spring guides 78 that are essentially tabs turned at right angles to main body 68 at locations that are laterally outward of the radially inner end of a respective edge of the respective slot 76. For purposes of explanation, it is to be understood that only the center lines of each brush and its guide lie on an exact radial to axis 36; hence any reference to a brush guide 50, its sidewalls 70, 72, the side edges of its slot 76, and mounting 52 as being radial means substantially parallel to a true radial.

Brushes 48 are rectangular in shape, and their laterally opposite sides contain straight, lengthwise extending slots 80 into which the inner edges of sidewalls 70, 72 are received, as especially shown by FIG. 4. With brushes 48 associated with brush guides 50 in this way, each brush is guided by its brush guide 50 for travel radial to axis 36.

Each spring 54 is a flat strip of coil spring material having uniform width. Each spring 54 comprises coils 82, 84 at opposite ends and a connecting segment 86 extending between these coils. A spring 54 is assembled to a brush guide 50 by disposing its coils 82, 84 relative to spring guides 78 so that connecting segment 86 passes across the radially inner face of each spring guide 78 and spans the open radially inner end of slot 76. A brush 48 is assembled by abutting its radially outer end against the portion of spring segment 86 that spans the open radially inner end of slot 76 and inserting the brush slots 80 onto the radially inner ends of the edges of sidewalls 70, 72. The brush is then slid radially outwardly on the brush guide forcing coils 82, 84 to partially uncoil and thereby expand the length of connecting segment 86 so that the latter assumes a shape like that illustrated. The brush is slid sufficiently far that the brush locking tabs, mentioned earlier, engage the radially outer end of the brush to retain the brush in such a retracted position until such time as the two casing parts 22a, 22b have been assembled together and the brushes are to be released to cause the respective spring 54 to urge the respective brush 48 into electrical contact with commutator 42, as shown by FIG. 3.

Brush guides 50 are formed of suitable material, such as brass, and fabricated by conventional fabrication technology comprising stamping and trimming methods so that each is of one-piece construction. The brushes are fabricated by known brush fabrication technology.

Because each brush 48 and its brush guide 50 are electric conductors, and because a potential difference is to be applied across the brushes to operate the motor, at least one brush holder assembly, and preferably both, are electrically insulated from casing 22. Mountings 52 are fabricated from electric insulator material, such as a suitable variety of rubber or plastic for example. The illustrated embodiment for each mounting 52 of a respective brush holder assembly 44, 46 comprises two individual parts 90, 92. Details are perhaps best seen in FIGS. 3 and 4.

Each part 90, 92 has a generally rectangular shape whose length may be considered to be parallel with a respective sidewall 70, 72 of main body 68 of a brush guide 50. Laterally inner faces of each part 90, 92 are mutually confronting, and each contains a respective lengthwise extending, straight groove 94 via which the respective part 90, 92 fits onto a laterally outer edge portion of a respective sidewall 70, 72 of a brush guide 50. When so assembled to a brush guide 50, each part 90, 92 extends radially inward from a radially outer edge of the respective main body 68, but stops short of the radially innermost edge of main body 68. As viewed in FIG. 3, main body 68 may be considered to be somewhat T-shaped, having respective laterally projecting tabs 96, 98 at the radially inner ends of its respective sidewalls 70, 72, with wiring tab 64 being formed with tab 98.

As shown by FIG. 4, grooves 94 are mutually confronting and disposed to space both brush 48 and brush guide 50 sufficiently from end wall 28 that neither is capable of making electric contact with the casing. The fitting of the two parts 90, 92 onto the brush guide can be sufficient by itself to maintain their assembled relation preparatory to assembling the brush holder assemblies onto casing end part 22b. FIG. 3 shows the guide and the parts 90, 92 to have respective locator features 93, 95, pointed dart shapes for example, for locating the parts 90, 92 in desired positions along the length of each brush guide's sidewall.

In the illustrated embodiment of FIGS. 3 and 4, assembly of each brush holder assembly to end part 22b is accomplished as follows. Mounting part 90 comprises a surface that is disposed against the interior surface of end part 22b. That surface of part 90 contains two spaced-apart, grommet-like projections 100 that protrude through respective holes 102 in end part 22b. At the location of each of these projections 100, a blind hole 104 extends into part 90 from an opposite surface of the part. Part 90 is fabricated from an elastomeric material that has a certain amount of compressibility and resilience. Part 90 is assembled to end part 22b by aligning the tip ends of projections 100 with holes 102. A tool, such as a mandrel 106 for example, can be inserted into each blind hole 104 to engage the bottom wall of the hole and push the projection 100 through the hole until a groove 100g engages the rim of the hole 102 as shown. The rubbery, deformable nature of the projections 100 allows them to pass through the holes 102, and the resiliency of the rubbery material allows the projections to expand back to their original shapes once grooves 100g have engaged the rims of the holes 102.

Part 92 is secured on end part 22b in a different manner. Part 92 is fabricated from a relatively non-compressible insulative material, such as molded, relatively rigid plastic. The face of part 92 that is disposed against the interior surface of end part 22b contains two space-apart blind holes 108. The shanks of headed screws 110 are passed from the exterior of end part 22b through clearance holes 112 in the end part, threaded into holes 108, and tightened via the screw heads to draw part 92 securely against the interior surface of the end part.

While the attachments of the two parts 90, 92 to end part 22b are different in FIGS. 3 and 4, it is to be understood that part 92 could be constructed to provide for the same type of attachment to end part 22b as mounting part 90, and vice versa. Once the brush holder assemblies have been assembled to the casing end part, the brushes are released via access openings 116 so that the springs will bias the brushes into engagement with the commutator.

Figure 5:
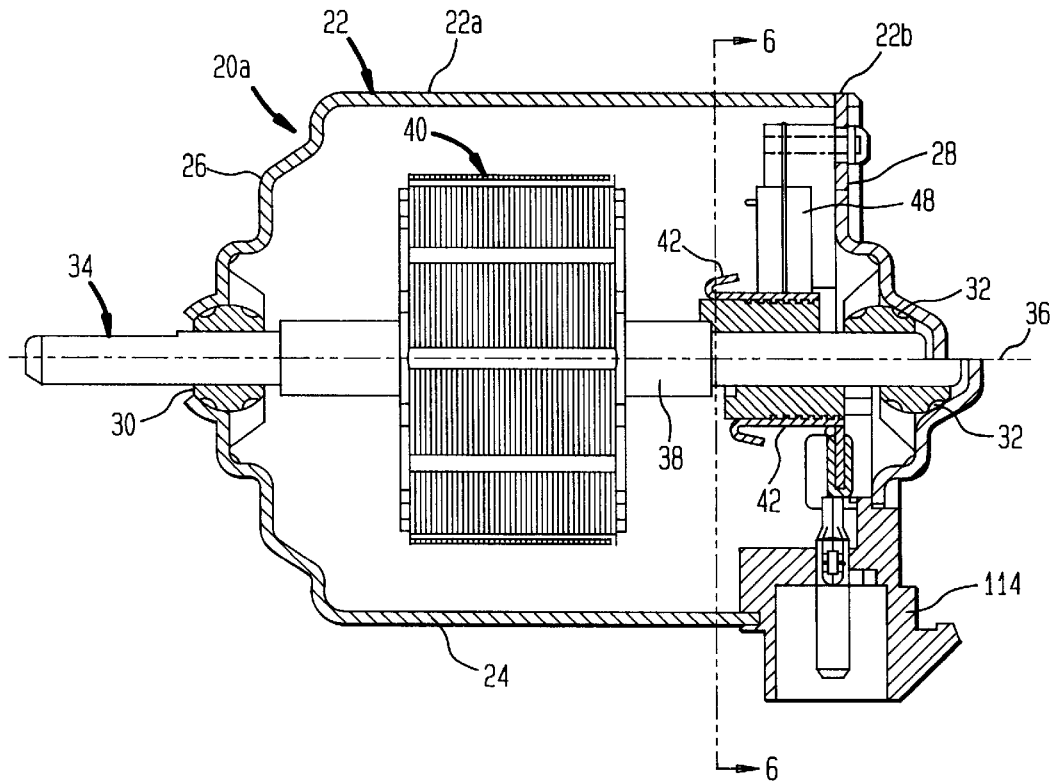
FIG. 5 is a longitudinal cross section view showing portions of another D.C. motor embodying brush holder assembly mountings in accordance with principles of the present invention.
Figure 6:
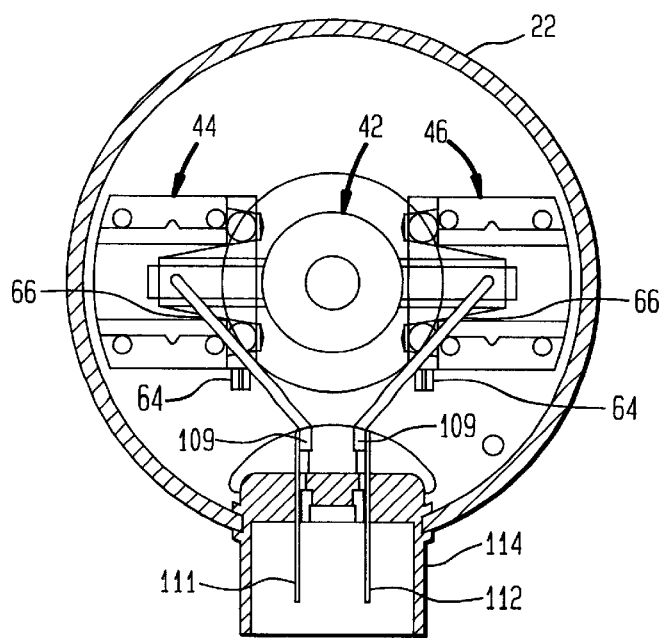
FIG. 6 is a transverse cross section view taken along line 6—6 in FIG. 5.

FIGS. 5 and 6 show another motor 20a having certain component parts that are the same as those of motor 20 and therefore identified by the same reference numerals. The two brush holder assemblies are mounted on end wall 28 in the same manner as previously described for the first motor embodiment. Insofar as the inventive principles are concerned, motor 20a differs from motor 20 in that the respective pig-tails 66 are crimped directly to respective wiring tabs 109 of respective electric terminals 110, 112 that are mounted in a non-conductive connector shell 114. Accordingly, wiring tabs 64 are unnecessary in this embodiment. Shell 114 mounts on casing 22 in similar manner to grommet 56, and the combination of terminals 110, 112, and shell 114 form a connector to which a mating connector (not shown) can be coupled to connect the motor with an electric motor control circuit.

FIGS. 7, 8, and 9 disclose a modified form of brush holder assembly. Elements of this modified form that are like corresponding elements of the FIG. 3 and 4 embodiment are identified by like reference numerals. The FIGS. 7, 8, and 9 embodiment differs from that of FIGS. 3 and 4 in that, the main body 68 is of cruciform shape having tabs 96, 98 projecting laterally from the middle of the main body, rather than at the radially inner end. Moreover, each tab 96, 98, contains a respective wiring tab 64. Each spring guide tab 78a is also somewhat different from its counterpart 78, being turned 90° from the FIG. 3 and 4 embodiment and containing a notch 78b. Notch 78b serves to guide the portion of the respective spring 54 that passes across the spring guide. The shapes of the two mounting parts 90a, 92a are also slightly different from their previous counterparts 90, 92 in that they contain notches 97 for receiving tabs 96, 98. By disposing the tabs 96, 98 in notches 97, the parts 90a, 92a are properly located along the length of each brush guide in the same way that locator features 93, 95 of the earlier embodiment located the parts 90, 92 on their brush guide. The attachments of the respective mounting parts 90a, 92a to end part 22b are the same, being the grommet-like projections 100 described above for part 90.

Figure 10:
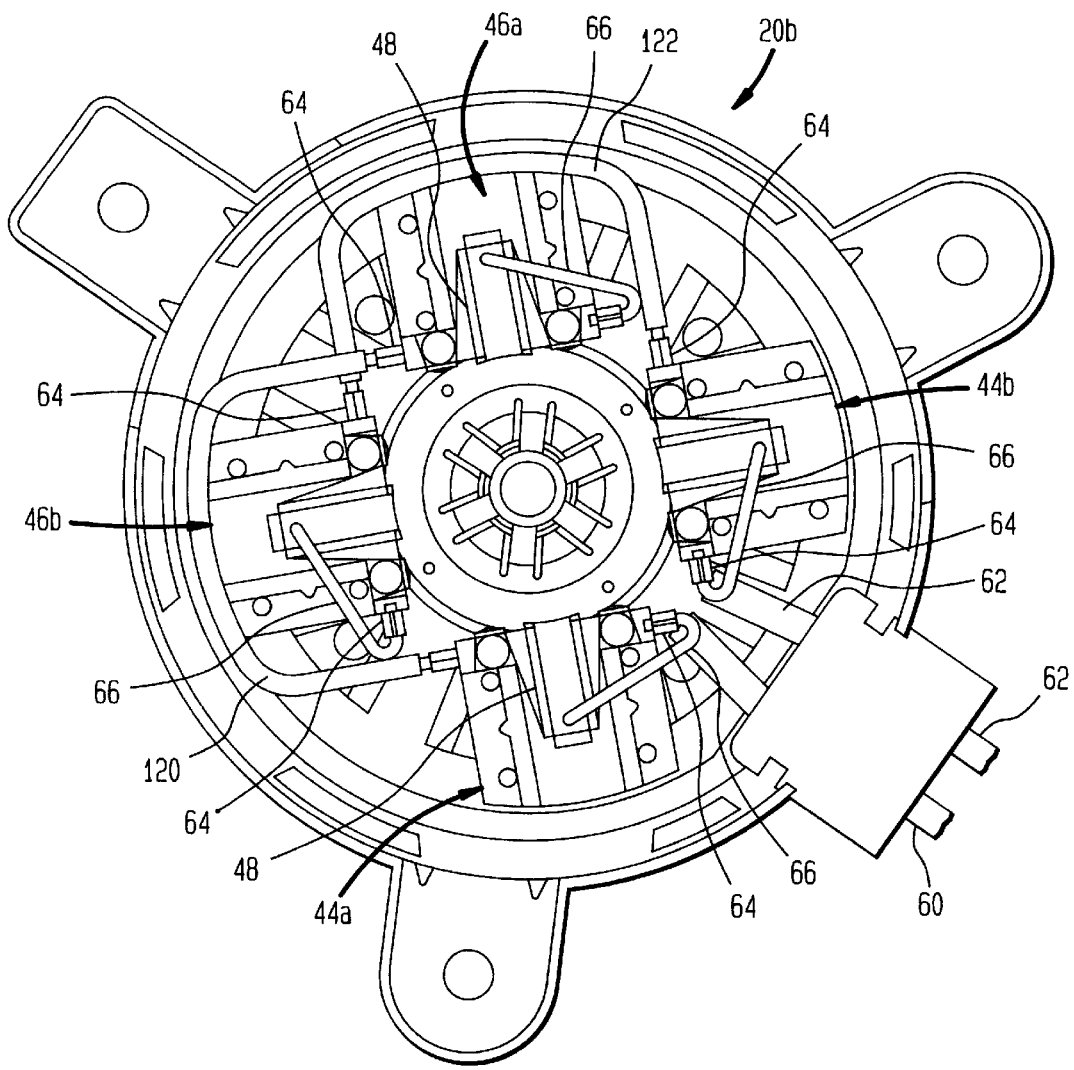
FIG. 10 is a transverse cross section view of a multi-pole motor embodying brush holder assembly mountings in accordance with principles of the present invention.

FIG. 10 shows a four-pole D.C. motor 20b which utilizes four brush holder assemblies like those of FIGS. 7, 8, and 9 and also mounted on an end closure part of the motor casing. Wire 60 is crimped to one of the wiring tabs 64 of a first brush holder assembly 44a to which the pig-tail 66 of the corresponding brush 48 is also crimped. The other wiring tab 64 of the first brush holder assembly 44a is crimped to a stripped end of an insulated wire 120. One of the wiring tabs 64 of a second brush holder assembly 46a that is diametrically opposite the first brush holder assembly 44a is crimped to the opposite end of wire 120, which has also been stripped of insulation. The other wiring tab 64 of the second brush holder assembly 46b is crimped to the pig-tail 66 of its brush 48. Wire 62 is crimped to one of the wiring tabs 64 of a third brush holder assembly 44b to which the pig-tail 66 of the corresponding brush 48 is also crimped. This third brush holder assembly is at 90° to the first and second brush holder assemblies. The other wiring tab 64 of the third brush holder assembly is crimped to a stripped end of an insulated wire 122. One of the wiring tabs 64 of a fourth brush holder assembly 46b that is diametrically opposite the third brush holder assembly 44b is crimped to the opposite end of wire 122, which has also been stripped of insulation. The other wiring tab 64 of the fourth brush holder assembly 46b is crimped to the pig-tail 66 of its brush 48.

Figure 11:
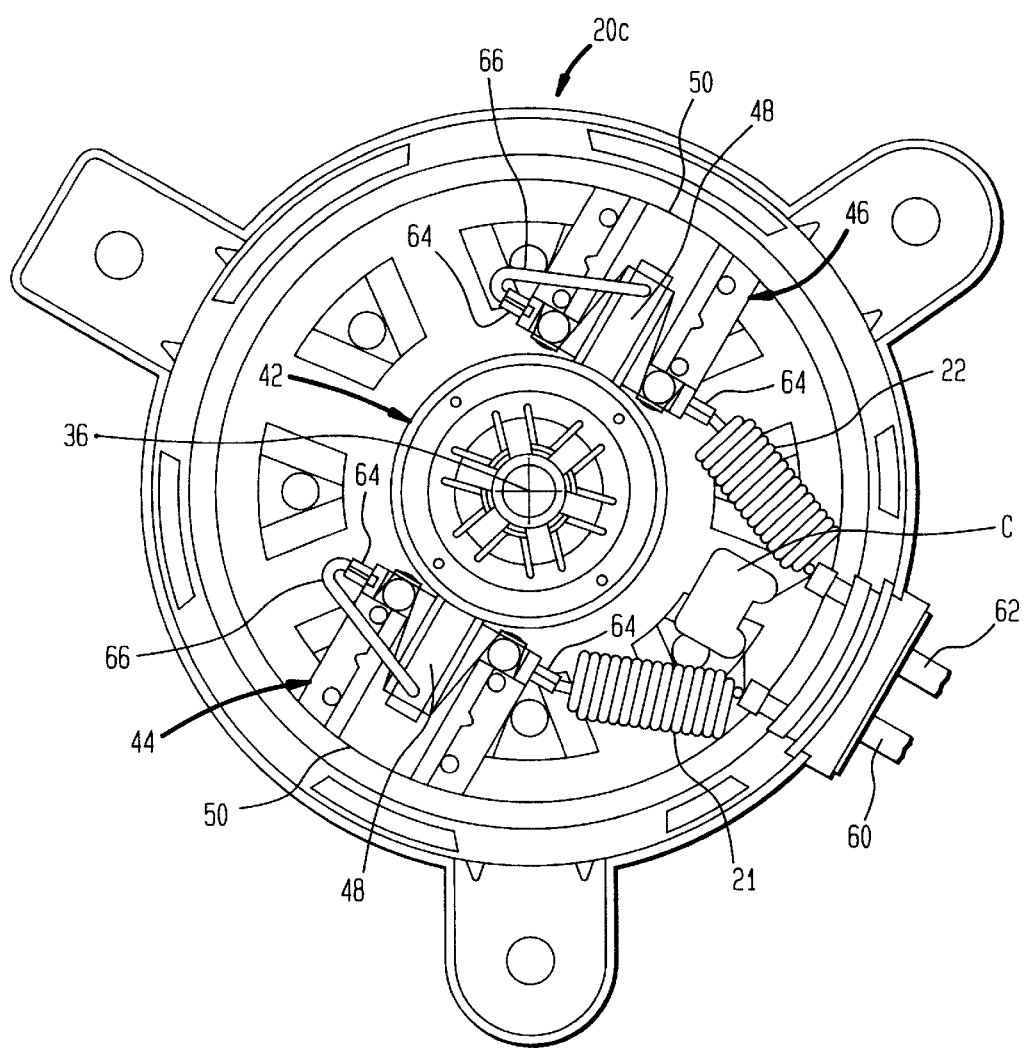
FIG. 11 is a transverse cross section view of still another motor embodying brush holder assembly mountings in accordance with principles of the present invention.

FIG. 11 shows a six-pole D.C. motor 20c which has brush holder assemblies 44, 46 similar to those of FIGS. 2 and 3. Like reference numerals are used in FIG. 11 to designate like component parts identified in previous description. Each brush holder is connected through a corresponding choke L1, L2 to a corresponding wire 60, 62. A capacitor C is connected across wires 60, 62 internally of the motor casing.

Figure 12:
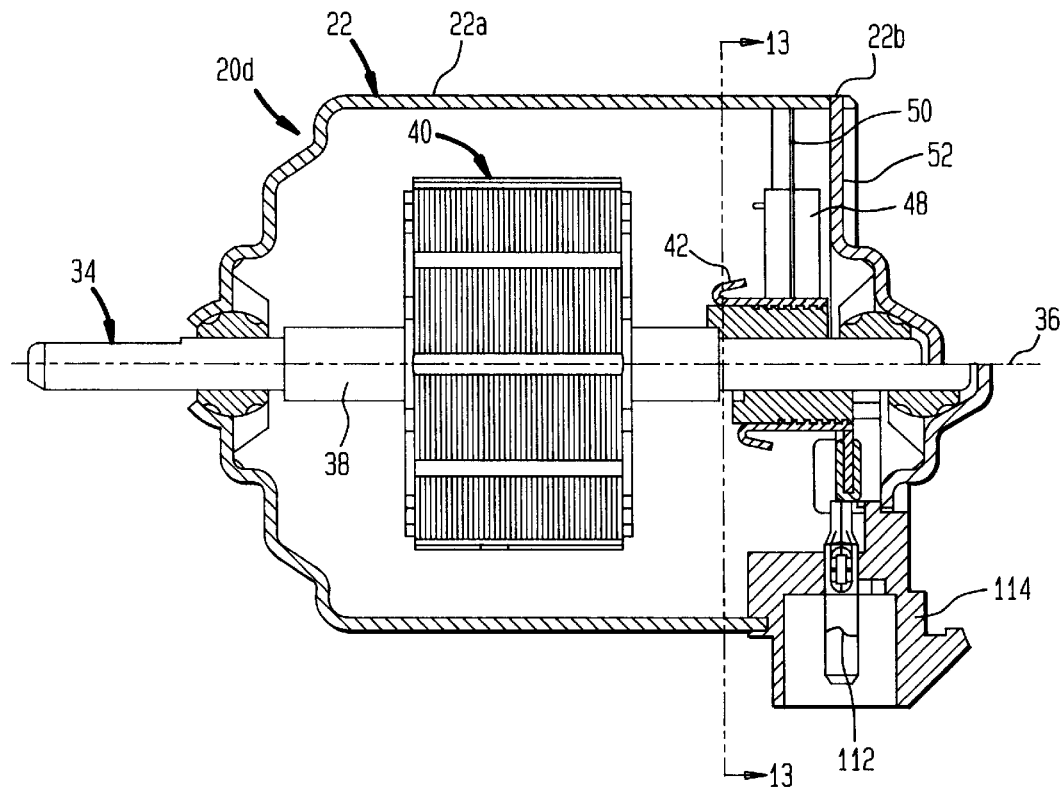
FIG. 12 is a longitudinal cross section view showing portions of another D.C. motor embodying brush holder assembly mountings in accordance with principles of the present invention.
Figure 13:
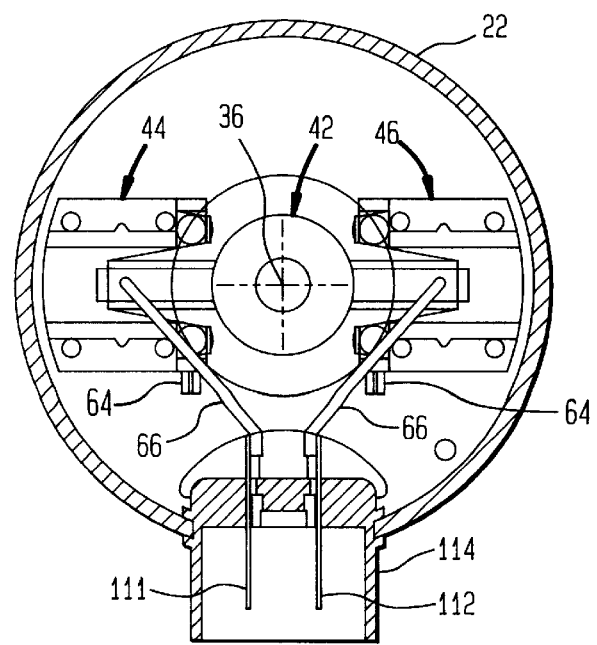
FIG. 13 is a transverse cross section view taken along line 13—13 in FIG. 12.

FIGS. 12 and 13 are similar to FIGS. 5 and 6, and like reference numerals will be used to designate like component parts in these Figs. FIGS. 12 and 13 show a motor 20d in which the end part 22b is relatively rigid and fabricated from an electrically insulative material, such as a suitable molded plastic. The mountings 52 can be separate parts that are mounted on the plastic end wall 22b by any suitable mounting means, such as screws, or they may be integrally formed either in whole, or in part, with the plastic end wall. If the main casing part 22a is also plastic, the outer end edges of brush guides 50 may touch it as shown in FIG. 12, but if it is not, the brush guides must be spaced radially inward so as not to contact it. If the mountings are integrally formed with end part 22b, the brush guides can be assembled to them by sliding them into the grooves 94 and suitable securing the brush guides in place.

While a presently preferred embodiment of the invention has been illustrated and described, it should be appreciated that principles of the invention apply to all embodiments falling within the scope of the following claims.

What is claimed is:

1. An electric machine comprising:
   a casing,
   an armature shaft assembly journaled for rotation on the casing about an axis of rotation and comprising an armature and a commutator disposed internally of the casing, the casing comprising a transverse wall that is disposed proximate the commutator, and at least one brush holder assembly disposed on the casing transverse wall, the brush holder assembly comprising:

a brush,
  a brush guide that supports and guides the brush for travel relative to the commutator in a direction that has a radial component relative to the axis of rotation, the brush guide including a generally flat plate member defining a side wall, and
  an electric insulator mounting that mounts the brush guide with respect to the transverse wall, the electric insulator mounting comprising at least one electric insulator element having a length extending in a direction generally parallel to the brush guide side wall and comprising a groove engaging an edge of the brush guide side wall at a location spaced from the transverse wall to support the brush guide and the brush in spaced relation with respect to the transverse wall, wherein said side wall being in generally parallel relation with respect to said transverse wall.

2. An electric machine as set forth in claim 1 in which the groove comprises opposite side portions that are spaced apart in a direction axially of the axis of rotation.

3. An electric machine as set forth in claim 2 in which the opposite side portions of the groove are mutually parallel and spaced apart a substantially uniform distance along the length of the groove.

4. An electric machine as set forth in claim 2 in which the groove is generally parallel to a radial to the axis of rotation.

5. An electric machine as set forth in claim 1 in which the brush guide comprises a part formed from metal of uniform thickness, the brush guide comprises a free edge portion having that uniform thickness, and the groove of the electric insulator element engages the brush guide by fitting onto that free edge portion of the brush guide.

6. An electric machine as set forth in claim 1 in which the electric insulator element comprises grooves which are spaced apart circumferentially of the axis of rotation, the grooves engaging the brush guide at a distance spaced from the transverse wall to support the brush guide and the brush in spaced relation to the transverse wall.

7. An electric machine as set forth in claim 6 in which the respective grooves engage respective edge portions of the brush guide at a distance spaced from the transverse wall to support the brush guide and the brush in spaced relation to the transverse wall.

8. An electric machine as set forth in claim 7 in which the respective grooves are generally parallel to a radial to the axis of rotation.

9. An electric machine as set forth in claim 6 in which the brush guide comprises a guide path for the brush disposed circumferentially between the respective grooves.

10. An electric machine as set forth in claim 6 in which the brush guide comprises marginal edge portions that define a slot providing the guide path for the brush, and the brush comprises grooves that fit onto these marginal edge portions.

11. An electric machine as set forth in claim 10 in which the guide path for the brush is substantially radial to the axis of rotation.

12. An electric machine as set forth in claim 1 including a bias spring for biasing the brush into engagement with the commutator.

13. An electric machine as set forth in claim 1 including attachment means for attaching the at least one electric insulator element to the transverse wall, the attachment means comprising a threaded fastener.

14. An electric machine as set forth in claim 1 including attachment means for attaching the at least one electric insulator element to the transverse wall, the attachment means comprising a grommet formation of the at least one insulator element engaging a hole in the transverse wall.

15. An electric machine as set forth in claim 1 in which the at least one electric insulator element comprises an integral formation in at least a portion of the transverse wall.

16. An electric machine as set forth in claim 15 including an attachment means for attaching each electric insulator element to the transverse wall, at least one attachment means comprising a threaded fastener.

17. An electric machine as set forth in claim 15 including an attachment means for attaching each electric insulator element to the transverse wall, at least one attachment means comprising a grommet formation of the corresponding insulator element engaging a hole in the transverse wall.

18. An electric machine as set forth in claim 17 in which the brush guide comprises a guide path for the brush disposed circumferentially between two electric insulator elements.

19. An electric machine as set forth in claim 17 in which two electric insulator elements comprise respective grooves that engage respective portions of the brush guide.

20. An electric machine as set forth in claim 17 including a bias spring for biasing the brush into engagement with the commutator.

21. An electric machine as set forth in claim 15 in which the at least one electric insulator element comprises an integral formation in at least a portion of the transverse wall.

22. An electric machine as set forth in claim 21 in which the respective grooves are generally parallel to a radial to the axis of rotation.

23. An electric machine as set forth in claim 15 in which the transverse wall is disposed in an end casing part of the casing.

24. An electric machine as set forth in claim 19 in which the brush guide comprises a part formed from metal of uniform thickness, the brush guide comprises free edge portions having that uniform thickness, and the grooves of the electric insulator elements engage the brush guide by fitting onto those free edge portion of the brush guide.

25. An electric machine as set forth in claim 1 in which the transverse wall is a formation of an end casing part of the casing.

26. An electric machine comprising:
  a casing,
  an armature shaft assembly journaled for rotation on the casing about an axis of rotation and comprising an armature and a commutator disposed internally of the casing, the casing comprising a transverse wall that is disposed proximate to the commutator, and at least one brush holder assembly disposed on the casing transverse wall, the brush holder assembly comprising:
  brush,
    a brush guide that supports and guides the brush for travel relative to the commutator in a direction that has a radial component relative to the axis of rotation, said brush guide including a generally flat plate member defining side walls, and
    an electric insulator mounting that mounts the brush guide with respect to the transverse wall, the electric insulator mounting comprising plural, spaced apart, electric insulator elements each having a length extending in a direction generally parallel to the side walls, each electric insulator element having a groove engaging a respective edge of a brush guide side wall at a location spaced from the transverse wall to support the brush guide and the brush in spaced relation with respect to the transverse wall, wherein said side wall being in generally parallel relation with respect to said transverse wall.

27. A brush holder assembly for mounting on an electric machine casing, the brush holder assembly comprising:

a brush, a brush guide that supports and guides the brush for travel, said brush guide including a generally flat plate member defining a side wall, and an electric insulator mounting for mounting the brush guide on a casing, the electric insulator mounting comprising:

at least one electric insulator element having a length extending in a direction generally parallel to the side wall and comprising a groove engaging an edge of the side wall of the brush guide to support the brush guide and the brush in spaced relation with respect to a casing when the brush holder assembly is mounted thereon, wherein said side wall being in generally parallel relation with respect to a transverse wall of said casing.

28. A brush holder assembly as set forth in claim 27 in which the groove comprises spaced apart opposite side portions.

29. A brush holder assembly as set forth in claim 28 in which the opposite side portions of the groove are mutually parallel and spaced apart a substantially uniform distance along the length of the groove.

30. A brush holder assembly as set forth in claim 27 in which the brush guide comprises a part formed from metal of uniform thickness, the brush guide comprises a free edge portion having that uniform thickness, and the groove of the electric insulator element engages the brush guide by fitting onto that free edge portion of the brush guide.

31. A brush holder assembly as set forth in claim 27 in which the electric insulator mounting comprises two such electric insulator elements which are spaced apart and each of which comprises a respective groove engaging the brush guide to support the brush guide and the brush in spaced relation to a casing when the brush holder assembly is mounted thereon.

32. A brush holder assembly as set forth in claim 27 in which the brush guide comprises a guide path for the brush disposed circumferentially between the two electric insulator elements.

33. A brush holder assembly as set forth in claim 32 in which the brush guide comprises marginal edge portions that define a slot providing the guide path for the brush, and the brush comprises grooves that fit onto these marginal edge portions.

34. A brush holder assembly for mounting on an electric machine casing, the brush holder assembly comprising:

a brush, a brush guide holder that supports and guides the brush for travel, the brush guide including a generally flat plate member defining a side wall, and plural electric insulator elements which are spaced apart and each of which has a length extending in a direction generally parallel to the side wall of the brush guide, each electric insulator element having a groove which engages a respective edge of the side wall of the brush guide to support the brush guide and the brush in spaced relation with respect to a casing when the brush holder assembly is mounted thereon, wherein said side wall being in generally parallel relation with respect to a transverse wall of said casing.

35. A brush holder assembly as set forth in claim 34 in which the electric insulator mounting comprises two such electric insulator elements which are spaced apart and each of which comprises a respective groove engaging the brush guide to support the brush guide and the brush in spaced relation to a casing when the brush holder assembly is mounted thereon.

36. A brush holder assembly as set forth in claim 35 in which the brush guide comprises a guide path for the brush disposed circumferentially between the two electric insulator elements.

37. A brush holder assembly as set forth in claim 36 in which the brush guide comprises marginal edge portions that define a slot providing the guide path for the brush, and the brush comprises grooves that fit onto these marginal edge portions.

38. An electric machine end casing assembly comprising:

an end casing, a brush holder assembly on the machine casing, the brush holder assembly comprising:

a brush, a brush guide that supports and guides the brush for travel, the brush guide including a generally flat plate member defining a side wall, and an electric insulator mounting for mounting the brush guide on the end casing, the electric insulator mounting having a length extending in a direction generally parallel to the side wall of the brush guide, the electric insulator mounting comprising at least one electric insulator element comprising a groove engaging an edge of the side wall of the brush guide to support the brush guide and the brush in spaced relation with respect to the end casing, wherein said side wall being in generally parallel relation with respect to a transverse wall of the end casing.

39. An electric machine end casing assembly as set forth in claim 38 including attachment means for attaching the at least one electric insulator element to the end casing, the attachment means comprising a threaded fastener.

40. An electric machine end casing assembly as set forth in claim 38 including attachment means for attaching the at least one electric insulator element to the end casing, the attachment means comprising a grommet formation of the at least one insulator element engaging a hole in the end casing.

41. An electric machine as set forth in claim 38 in which the at least one electric insulator element comprises an integral formation in at least a portion of the end casing.

42. An electric machine comprising:

a casing, an armature shaft assembly journaled for rotation on the casing about an axis of rotation and comprising an armature and a commutator disposed internally of the casing, the casing comprising a transverse wall that is disposed proximate the commutator, and at least one brush holder assembly disposed on the casing transverse wall, the brush holder assembly comprising:

a brush, a brush guide that supports and guides the brush for travel relative to the commutator in a direction that has a radial component relative to the axis of rotation, and an electric insulator mounting that mounts the brush guide with respect to the transverse wall, the electric insulator mounting comprising at least one electric insulator element comprising a groove engaging the brush guide at a location spaced from the transverse wall to support the brush guide and the brush in spaced relation with respect to the transverse wall, and wherein the brush guide comprises marginal edge portions that define a slot providing the guide path for the brush, and the brush comprises grooves that fit onto the marginal edge portions.

43. A brush holder assembly for mounting on an electric machine casing, the brush holder assembly comprising:

a brush, a brush guide that supports and guides the brush for travel, and an electric insulator mounting for mounting the brush guide on a casing, the electric insulator mounting comprising:

at least one electric insulator element comprising a groove engaging the brush guide to support the brush guide and the brush in spaced relation to a casing when the brush holder assembly is mounted thereon, wherein the brush guide comprises a guide path for the brush disposed circumferentially between two electric insulator elements, and wherein said brush guide comprises marginal edge portions that define a slot providing the guide path for the brush, and the brush comprises grooves that fit onto these marginal edge portions.

* * * * *